US008823904B2

(12) United States Patent
Fan et al.

(10) Patent No.: US 8,823,904 B2
(45) Date of Patent: Sep. 2, 2014

(54) LIQUID CRYSTAL DISPLAY DEVICE

(75) Inventors: Shih-Hung Fan, Hsinchu (TW); Yuhren Shen, Hsinchu (TW); Cheng-Chung Peng, Hsinchu (TW); Hsin-Ta Lee, Hsinchu (TW)

(73) Assignee: Innolux Corporation, Miao-Li County (TW)

( * ) Notice: Subject to any disclaimer, the term of this patent is extended or adjusted under 35 U.S.C. 154(b) by 341 days.

(21) Appl. No.: 12/981,068

(22) Filed: Dec. 29, 2010

(65) Prior Publication Data

US 2011/0164206 A1 Jul. 7, 2011

(30) Foreign Application Priority Data

Jun. 25, 2010 (TW) ................................ 99120857 A

(51) Int. Cl.
*G02F 1/1335* (2006.01)
(52) U.S. Cl.
USPC .................................................... 349/96
(58) Field of Classification Search
None
See application file for complete search history.

(56) References Cited

U.S. PATENT DOCUMENTS

| 6,108,064 A * | 8/2000 | Minoura et al. ............... 349/130 |
| 2002/0085152 A1 | 7/2002 | Chuang et al. |
| 2003/0071952 A1 | 4/2003 | Yoshida et al. |
| 2004/0227896 A1 * | 11/2004 | Yakovenko et al. .......... 349/178 |
| 2007/0199504 A1 | 8/2007 | Nakamura et al. |

FOREIGN PATENT DOCUMENTS

| JP | 2001-154200 | 6/2001 |
| JP | 2005-352091 | 12/2005 |
| JP | 2006-113209 A | 4/2006 |
| WO | WO-2007/032356 A1 | 3/2007 |

* cited by examiner

*Primary Examiner* — Sarah Hahm
(74) *Attorney, Agent, or Firm* — Muncy, Geissler, Olds & Lowe, P.C.

(57) ABSTRACT

The present invention provides an improved type of liquid crystal (LC) display device with wide-viewing angle and high optical transmittance. The LC display of the present invention consists of: at least one LC alignment apparatus, which makes the LC molecules within the display area forming a continuous-domain or multi-domain alignments, and hence improve its wide-viewing-angle characteristics; a LC layer formed by Nematic type LC with chiral dopants, and with optimal parameters of the optical path difference Δnd and LC rotations of d/p ratio, such that LC molecules can be aligned along all radial directions to achieve optimal transmittance, and thus producing an wide-viewing-angle LC display improved transmittance without the formation of dark fringes in the display area.

35 Claims, 14 Drawing Sheets

α=45

α=0

α=45

α=0

α=45

α=0 d/p=0.278

$V \geqq V_{th}$ (a1)

(a2)

(b1)

(b2)

C (c1)

LIQUID CRYSTAL DISPLAY DEVICE

BACKGROUND OF THE INVENTION

1. Field of the Invention

The present invention is related to a liquid crystal display (LCD) device, particularly to an improved type of LCD device with wide-viewing-angle and high optical transmittance.

2. Background of the Invention

The intensity of light passing through a LCD device is controlled by the alignments of liquid crystal (LC) molecules between two transparent electrodes of the device. Depending on the polarization and refraction properties of light passing through the LC molecules with different alignments, the optical transmittance and the viewing angle can be very distinct for different types of LCD devices. For the conventional twisted nematic (TN) type LCD, the device can exhibit a superior optical transmittance. However, as the effective LC birefringence has a strongly viewing angle dependent, the problem of TN type LCD is that viewing angles are very restrictive.

To overcome this problem, manufacturers have developed various type of wide-viewing-angle LCDs, such as multi-domain vertical alignment (MVA) and patterned vertical alignment (PVA) modes. The wide viewing angle of the PVA mode is achieved by using the fringe-field effect and optical compensation by retardation films. For the MVA mode, each pixel was divided into multiple domains by using protrusions or electrode (ITO) patterns on the top and bottom substrates, by which the LC molecules in different domains can be aligned to different in-plane directions, such that both the transmittance and viewing angle can be increased.

To date, the commonly used technologies for wide viewing angle are based on the vertical alignment (VA) mode. However, no matter using MVA or PVA modes, a disconnection line (or an optical dark fringe) always appears in the area near the protrusions or the electrode patterns between two adjacent domains, because at which the LC molecules are not affected by the electric field between the two electrodes. This phenomenon leads to some singular points in each pixel and, as a consequence, a deficient image quality.

Therefore, it is very important to develop a technology for LCD devices with a wide viewing angle and a high optical transmittance, but without optical dark fringes near the multi-domain boundaries in each pixel.

SUMMARY OF THE INVENTION

It is an object of the present invention to provide an improved liquid crystal (LC) display device, which has a wide viewing angle, but still retaining a high optical transmittance without optical dark fringes.

In order to achieve the abovementioned objects, the LC device of the present invention uses TN type LC with chiral dopants, such that the LC molecules within the display area can form a continuous-domain or multi-domain alignments, similar to the MVA or PVA modes. Thereby, the present invention not only improves the viewing angle of LC devices, but also takes the advantage of high transmittance in conventional TN type LC.

The technical features of the present invention are:

(1) using TN type LC with chiral dopants as a LC layer with optimal parameters of the optical path difference $\Delta nd$ and LC rotations of d/p ratio, such that at least 90% transmittance can be achieved for LC aligning along all azimuthal angles.

(2) the LC molecules within the display area can form a continuous-domain or multi-domain alignments, as will be detailed in preferred embodiments below.

The advantages of the LC device of the present invention include:

(1) A higher transmittance without dark fringes near the domain boundaries when the parameters $\Delta nd$ and d/p satisfy the condition of maximal polarization rotation effect;

(2) A wide viewing angle when LC molecules form a continuous-domain or multi-domain alignments with respect to the geometric center of the structure; and (3) A higher contrast ratio when negative TN type LC with chiral dopants was used in the LC layer.

The following detailed description, given by ways of examples or embodiments, will best be understood in conjunction with the accompanying drawings.

DETAILED DESCRIPTION OF THE INVENTION

In the following descriptions, examples and embodiments are in accordance with transmissive-type LCD devices. The structures and methods involved in these descriptions are also applicable to Trans-reflective type LCD devices.

Figure 1:
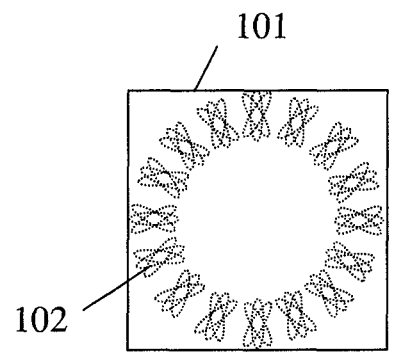
FIG. 1 is a top view of the LC alignments in a square display area.

The main feature of the present invention is the symmetric design of the LC alignment apparatus in the display area, in which TN type LC with chiral dopants will form a continuous-domain or multi-domain alignments. In the present invention, a pixel generally consists of at least one display area, of which the geometric shape can be, but not limited to, a square or a rectangular. FIG. 1 is a top view of the LC alignment of the present invention and shows a square display area 101. The alignment of LC molecules 102 twisted gradually from the first substrate to the second substrate, forming a symmetrically radial alignment. Because the long axes of the LC molecules are aligned along all azimuthal angles, a wide viewing angle can be achieved. In addition, due to the twisted alignment of the LC molecules, no singular point will occur. Therefore, by optimizing the phase and twisting angle of the LC molecules, a higher transmittance can be achieved without the formation of dark fringes.

The abovementioned LC alignment apparatus can be formed by protrusions structures, indentations structures, electrode (ITO) patterns on the substrates, or an alignment film to produce multi-domain and symmetric alignment of LC molecules in the display area. In principle, for a LC alignment apparatus with a geometrically symmetric structure, the corresponding LC alignment is also symmetric with respect to the geometric center of the alignment apparatus. However, the structure of a practical pixel is usually not perfectly symmetric, because each pixel also contains a thin-film-transistor (TFT) device, which inevitably breaks the symmetric design of the LC alignment structure. Therefore, for practical applications, it is necessary to add a second alignment structure at the geometric center of the display area to stabilize the LC alignment. The second alignment structure should have a dimension comparable or even somewhat larger than the thickness of the LC layer. Such an alignment structure will be further elucidated in the embodiments described below.

Figure 2:
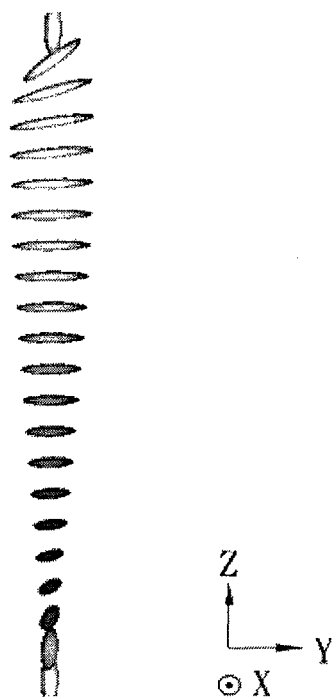
FIG. 2 is a cross sectional views of LC molecules in the twisted vertical alignment mode under a high gray-level driving voltage.

The LC layer of the present invention is formed by a TN type LC, which can be either negative TN type or positive TN type. For negative TN type LC with chiral dopants for vertical alignment mode, the LC molecules are twisted and tilted along one particular axis. Therefore this kind of structure is also referred to as a twisted vertical alignment (TVA) mode, where the twisted angle of LC molecules can be controlled by the doping concentration of chiral materials. If d is the thickness of LC layer and p is the chiral pitch, then the ratio of d/p represents the twisted angle of the LC molecules across the LC layer. FIG. 2 is a cross-sectional view of LC molecules in the TVA mode under a high driving voltage. The LC molecules are vertically aligned on the surfaces of both substrates, while they are twisted and tilted to a horizontal alignment in the middle of the LC layer. With the increasing driving voltage, the region containing horizontally aligned LC is also increased.

Figure 3:
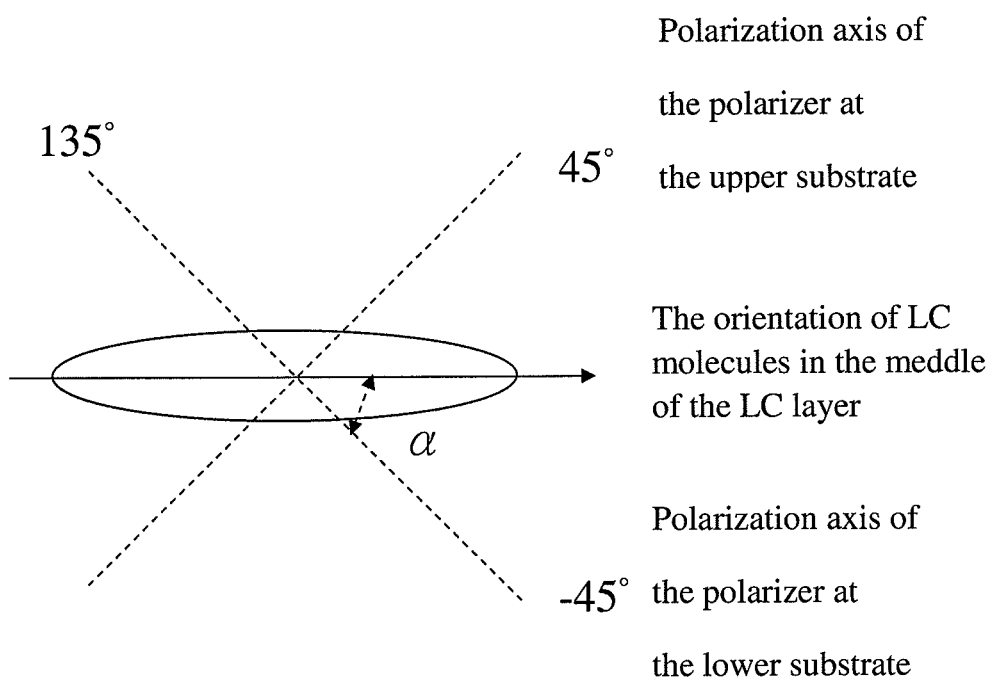
FIG. 3 is a schematic illustrating the definition of $\alpha$ angle.
Figure 4A:
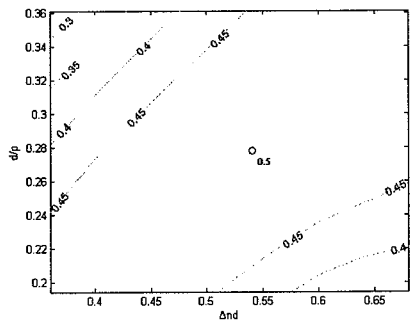
FIGS. 4A and 4B are contour plots of the optical transmittance T through the LC cell with different $\Delta nd$ and d/p at $\alpha=45°$ (4A) and $\alpha=0°$ (4B) when the LC alignments at the upper and the lower substrate are the same. The optical transmittances are calculated based on the finite-element method using a incident light with $\lambda=500$ nm and considering a pretilt angle of 89.5° for LC molecules on both the lower and the upper substrates under a high gray-level diving voltage.
Figure 4B:
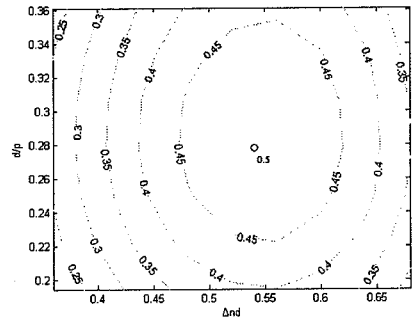
Figure 4C:
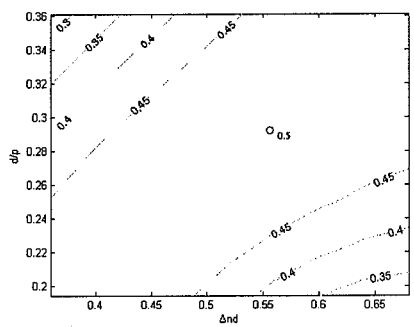
FIGS. 4C and 4D are contour plots of the optical transmittance T through the LC cell with different $\Delta nd$ and d/p at $\alpha=45°$ (4C) and $\alpha=0°$ (4D) when the LC alignments at the upper and the lower substrate are perpendicular.
Figure 4D:
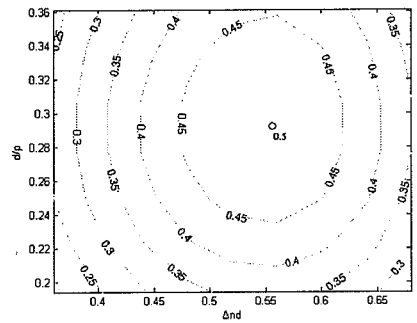
Figure 4E:
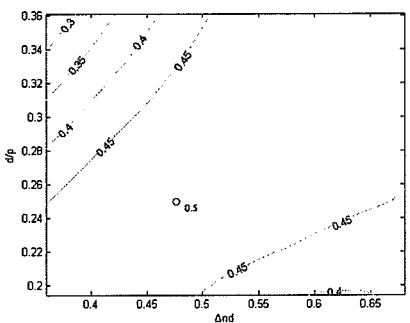
FIGS. 4E and 4F are contour plots of the optical transmittance T through the LC cell using positive TN type LC with different $\Delta nd$ and d/p at $\alpha=45°$ (4E) and $\alpha=0°$ (4F) when the LC alignments at the upper and the lower substrate are perpendicular.
Figure 4F:
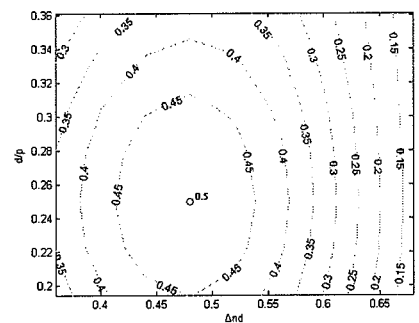

Because the LC material is birefringent, a polarized light passing through the LC layer will lead to a phase retardation. If $\Delta n$ is the index of birefringence of the LC material (i.e., the difference in the indices of refraction along the fast and slow axes), the wavelength of incident light is $\lambda$, then the phase retardation through the LC layer is given by $(2\pi/\lambda)\Delta nd$, where $\Delta nd$ is the optical path difference. By optimizing the two parameters $\Delta nd$ and $d/p$, it is possible to achieve a maximal polarization rotation effect, and thereby, the polarization of incident light from the first substrate can be efficiently rotated toward the second substrate to produce the largest optical transmittance for an arbitrary $\alpha$ angle. (The $\alpha$ angle is defined in FIG. 3, which is the angle between the orientation of LC molecules in the meddle of the LC layer and the polarization axis of one of the polarizers.) In order to find the optimal parameters of $\Delta nd$ and $d/p$, we performed numerical calculations based on finite-element method (FEM) for determining the optical transmittance T as functions of $\Delta nd$ and $d/p$ for a single domain structure under different conditions, such as the direction of LC alignment, the gray-level driving voltage and the $\alpha$ angle, etc. FIGS. 4A and 4B are contour plots of the optical transmittance T through the LC cell with different $\Delta nd$ and $d/p$ at $\alpha=45°$ (4A) and $\alpha=0°$ (4B) when the LC alignments at the upper and the lower substrate are the same. The optical transmittances are calculated based on the FEM using a incident light with $\lambda=500$ nm and considering a pretilt angle of $89.5°$ for the LC molecules on both the lower and the upper substrates under a high gray-level diving voltage (9V). The circle in FIG. 4 indicates the condition of $\Delta nd$ and $d/p$ satisfying the maximum transmittance $T_{max}=0.5$. Depending on the requirement of practical applications, we can select a minimum transmittance value $T_{min}$ that meets the requirement of a given application, such that in the contour map T, there must exist a corresponding set of parameters $\Delta nd$ and $d/p$, in which all parameters of $\Delta nd$ and $d/p$ satisfy $T \geq T_{min}$ for an arbitrary $\alpha$ angle. Therefore, the parameter range of the corresponding set will be the optimal range of parameters $\Delta nd$ and $d/p$ of the present invention. For example, if a given application require a minimum transmittance at least up to 90% of the maximum transmittance, i.e., $T_{min}=0.9T_{min}$, then, according to the contour maps of transmittance shown in FIGS. 4A and 4B, we can find a first set and a second set of parameters $\Delta nd$ and $d/p$ that satisfy $T \geq 0.9T_{max}$ at $\alpha=45°$ and $\alpha=0°$, respectively. The optimal parameters of $\Delta nd$ and $d/p$ is therefore lying in the subset defined by the intersection of the first and the second set of parameters. According to our simulations, for the LC layer with a pretilt angle of $89.5°$ for the LC molecules on both the lower and the upper substrates (as shown in FIGS. 4A and 4B), the optimal ranges of parameters that satisfying $T \geq 0.9T_{max}$ are $\Delta nd=0.465$-$0.620$ and $d/p=0.222$-$0.354$. FIGS. 4C and 4D are contour plots of the optical transmittance T through the LC cell as functions of $\Delta nd$ and $d/p$ at $\alpha=45°$ (4C) and $\alpha=0°$ (4D) when the LC alignments at the upper and the lower substrate are perpendicular. From FIGS. 4C and 4D, we can find that the optimal ranges of parameters that satisfying $T \geq 0.9T_{max}$ are $\Delta nd=0.470$-$0.620$ and $d/p=0.235$-$0.360$. FIGS. 4E and 4F are contour plots of the optical transmittance T through the LC cell using positive TN type LC with different $\Delta nd$ and $d/p$ at $\alpha=45°$ (4E) and $\alpha=0°$ (4F) when the LC alignments at the upper and the lower substrate are perpendicular. Similarly, we can find that the optimal ranges of parameters that satisfying $T \geq 0.9T_{max}$ are $\Delta nd=0.415$-$0.540$ and $d/p=0.194$-$0.313$, according to the contour maps shown in FIGS. 4E and 4F.

Figure 5:
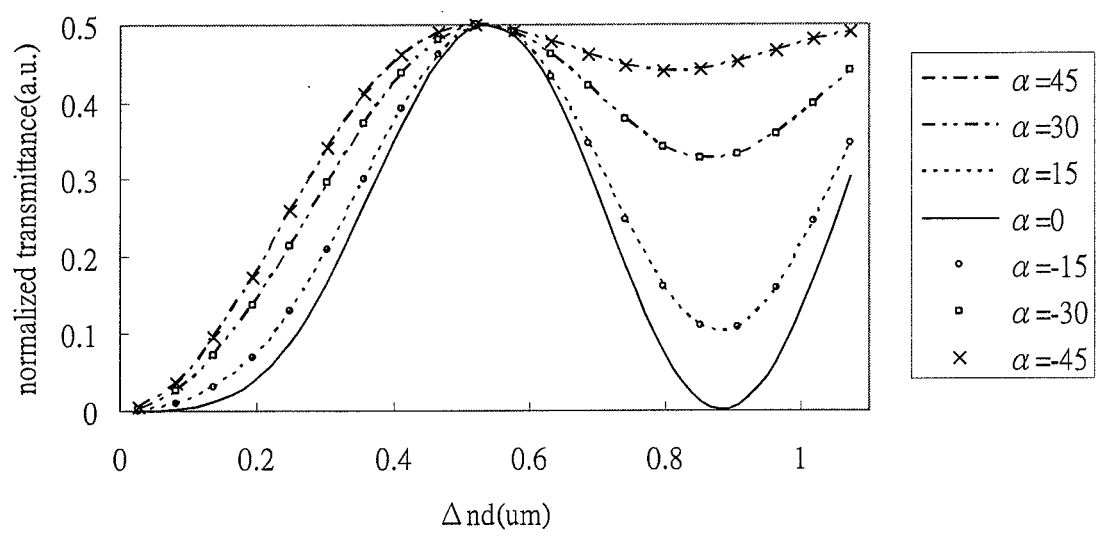
FIG. 5 shows a the optical transmittance T at different $\alpha$ angles as a function of $\Delta nd$ for a negative TN type LC with the same alignments on the upper and the lower substrates and d/p=0.278.

Now we discuss the conditions for the maximal transmittance. FIG. 5 shows the optical transmittance T at different $\alpha$ angles as a function of $\Delta nd$ when $d/p$ is fixed at an optimal parameter. The curves shown in FIG. 5 are from negative TN type LC with the same alignments on the upper and the lower substrates and $d/p=0.278$ at different $\alpha$ angles. We can see that, when $\Delta nd=0.53$, the maximum transmittance can be achieved, i.e., $T=T_{max}$, for all $\alpha$ angles. When the LC alignments on the upper and the lower substrates are perpendicular, the corresponding parameters are $\Delta nd=0.556$ and $d/p=0.292$. Under this condition of above parameters, the characteristic of the curves the transmittance of which changes with parameter "$\Delta nd$" is similar to that of the curves shown in FIG. 5. For positive TN type LC with the same horizontal alignments on the upper and the lower substrates, we find a condition of $\Delta nd=0.476$ and $d/p=0.25$ that can meet the requirement of $T=T_{max}$ for all $\alpha$ angles. and $d/p=0.25$ at different $\alpha$ angles. Under this condition of the parameters, the characteristic of the curves, the transmittance of which changes with parameter "$\Delta nd$", is similar to that of the curves shown in FIG. 5.

For the multi-domain and continuous-domain LC alignments of the present invention, the alignment of LC molecules in all radial directions means that all possible $\alpha$ angles occur in a single display area. Therefore, the abovementioned optimal parameter ranges of $\Delta nd$ and $d/p$ can be applied to the present invention to achieve the maximal transmittance through the LC cell. In addition, because the TVA mode LC also possesses the character of VA mode, a very low transmittance in the dark state and hence a high contrast ratio can be achieved.

Figure 6A:
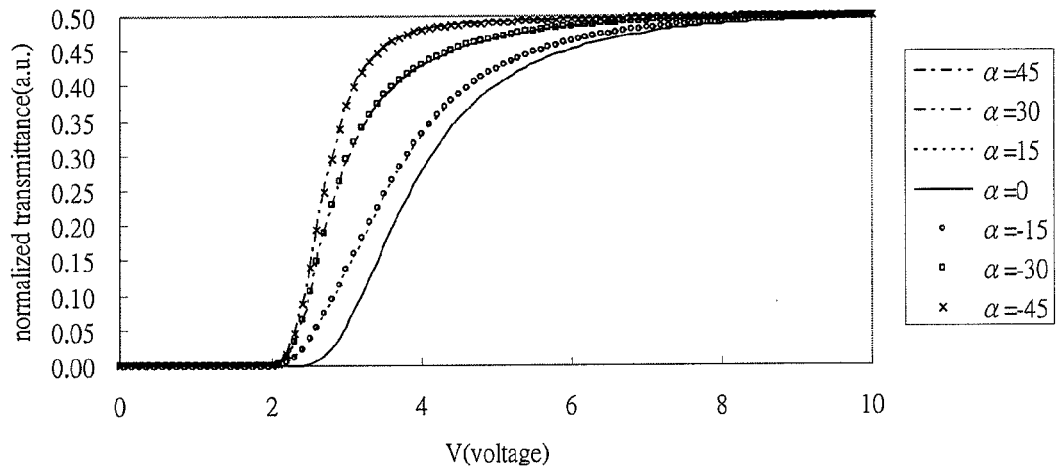
FIGS. 6A and 6B are the optical transmittance T as a function of the driving voltage V (T-V curve) at different $\alpha$ angles for the TVA mode LC of the present invention under the conditions of: (6A) d/p=0.278, $\Delta nd=0.4675$; and (6B) d/p=0.278, $\Delta nd=0.53$.
Figure 6B:
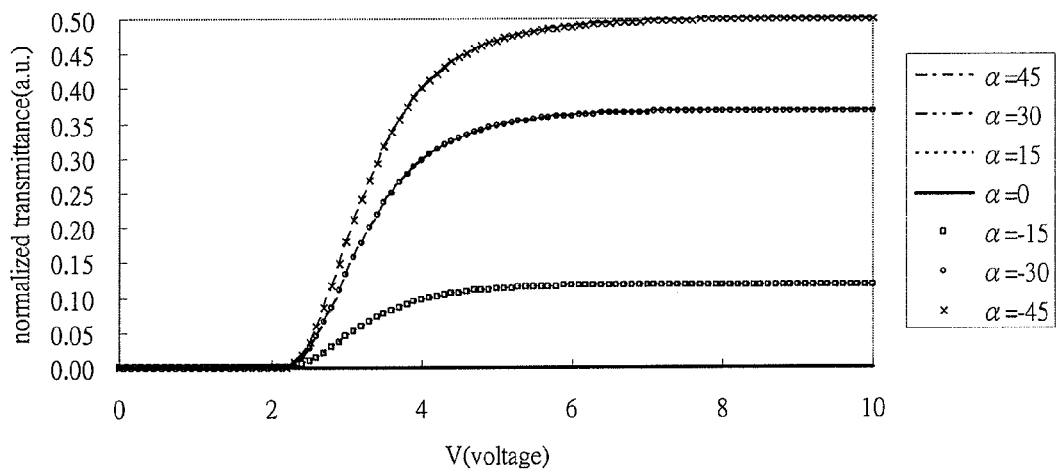

FIG. 6A is the optical transmittance T as a function of the driving voltage V (T-V curve) at different $\alpha$ angles for the TVA mode LC of the present invention under the conditions of: $d/p=0.278$, $\Delta nd=0.53$. In FIG. 6B, the optical transmittance T as a function of the driving voltage (T-V curve) at different $\alpha$ angles for the conventional VA mode LC is displayed. As far as the peak transmittance is concerned, one can see from FIG. 6A that, when $\Delta nd=0.53$, the maximum transmittance can be achieved $T=T_{max}$ under a high driving voltage (V=10V), regardless of the $\alpha$ angle. However, for the case of conventional VA mode LC shown in FIG. 6B, because there is no polarization rotation effect in the VA mode LC layer, the transmittance $T=T_{max}$ can achieved only when $\alpha=\pm45°$. As the $\alpha$ angle is varied, the transmittance T drops dramatically, even down to zero when the LC molecules are aligned with the polarization axis of the polarizer ($\alpha=0°$). As a consequence, dark fringes will appear near those regions with $\alpha=0°$ in the conventional VA mode LC with either continuous domain or multi-domain alignments, considerably degrading the optical transmittance and the image quality.

Figure 7:
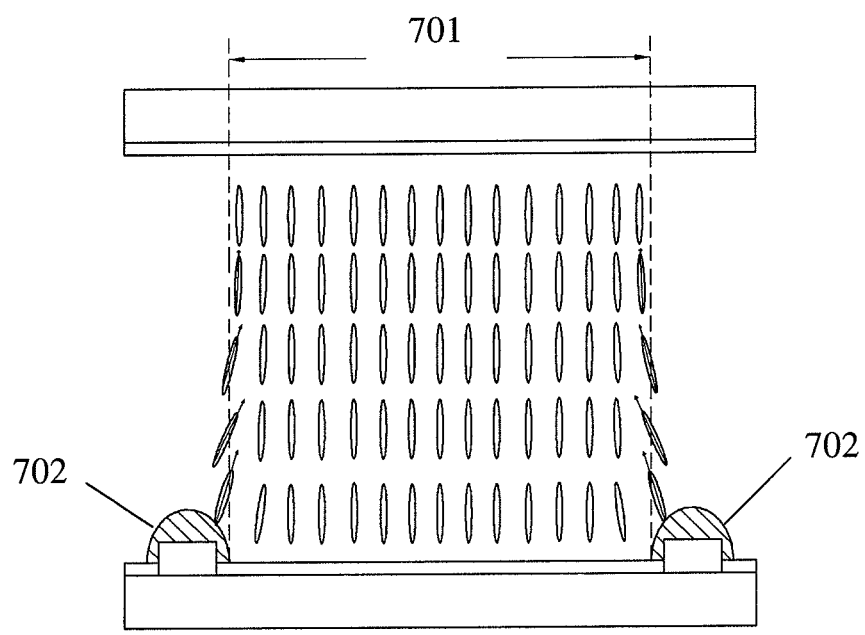
FIG. 7 is a schematic illustrating the structure of protrusions disposing at edges of a display area for LC alignments.
Figure 8A:
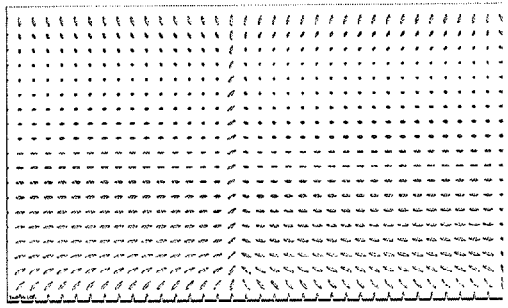
FIGS. 8A and 8B are the alignment of LC molecules calculated by finite-element method according to the structure shown in FIG. 7 with the condition of $\Delta nd=0.56$ and under a diving voltage, where 8A is a cross sectional view and 8B is a top view of the LC layer in the middle of the cell.
Figure 8B:
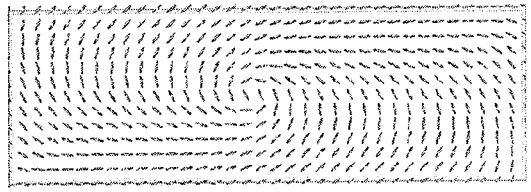
Figure 8C:
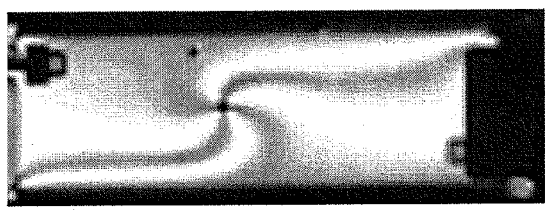
FIGS. 8C and 8D are the measured transmittance patterns of a TVA mode LC under a low gray-level (8C) and a high gray-level (8D) driving voltages.
Figure 8D:
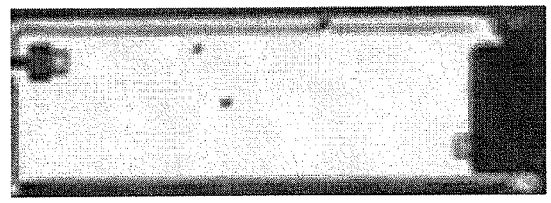

In order to further elucidate the implementation of embodiments, we describe four different types of embodiments in the following:

Embodiment I:

This embodiment is based on the non-rubbing alignment, using protrusions or fringe field as LC alignment apparatuses. FIG. 7 is a schematic of the cross-sectional view of the display area 701, in which protrusion structures 702 are disposed in the surrounding of the display area as the LC alignment apparatus. In this structure, the TVA mode LC is formed by negative TN type LC doped properly with chiral materials, so that the parameters $\Delta nd$ and $d/p$ of the structure meet the optimal condition. Before applying bias voltage, the LC molecules away from the protrusion structures are vertically aligned on the surface of the substrates by a vertical alignment film, while those LC molecules near the protrusion structures are pretilted to a specific direction. FIG. 8 shows the alignment of LC molecules calculated by the FEM according to the structure shown in FIG. 7 with the condition of $\Delta nd=0.56$ and under a diving voltage. FIG. 8A is the cross-sectional view of the LC layer, while FIG. 8B is the top view of the LC alignment in the middle of the LC layer. The LC molecules near the edges of the display area are tilted toward the center by the protrusion structures, forming a continuous-domain symmetric alignment throughout the display area. In these calculations, the polarization axes of the first and the second polarizers are set to 0° and 90°. For the TVA mode LC, the transmittance throughout the display area can achieve the maximal transmittance and without the formation of dark fringes. On the contrary, for the conventional VA mode LC, the overall transmittance is reduced due to the formation of dark fringes near the area where the LC molecules are aligned parallel to the polarization axis. FIGS. 8C and 8D are the measured transmittance patterns of the TVA mode LC under a low gray-level and a high gray-level driving voltages, respectively. In this structure, the protrusion structures in the surrounding drive the LC molecules to form a continuous-domain alignment toward the geometric center of the display area, so that the total optical transmittance can be increased without the formation of dark fringes therein.

Figure 9:
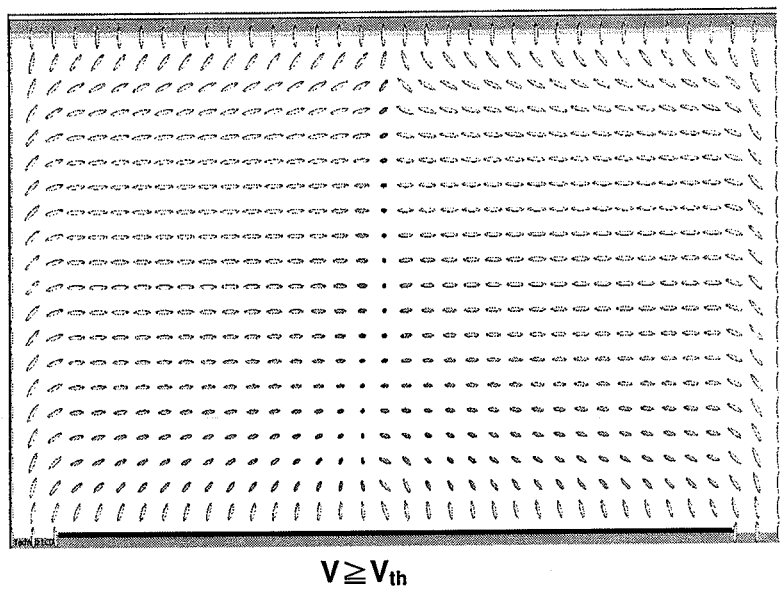
FIG. 9 is a cross sectional view of the TVA mode LC using fringe fields without a driving voltage (V=0) and with a driving voltage higher than the threshold voltage ($V \geq V_{th}$), respectively.

Protrusion structures in the surrounding of a display area can also be replaced by electrode patterns to produce a fringe field distribution in the surrounding for LC alignments. FIG. 9 is a cross sectional view of the TVA mode LC using fringe fields without a driving voltage (V=0) and with a driving voltage higher than the threshold voltage ($V \geq V_{th}$), respectively. Without applying a voltage between the upper electrode on the upper substrate and the lower electrode on the lower substrate, all the LC molecules are vertically aligned. When a voltage V larger than the threshold voltage $V_{th}$ is applied, the mismatch in area between the upper and the lower electrodes will form a fringe field distributed around of the pixel area, and thereby tilting the LC molecules near the fringe field, as shown in FIG. 9. The alignment of LC molecules by the fringe field shown in FIG. 9 is very similar to that by the protrusion structures shown in FIG. 8B.

Figure 10:
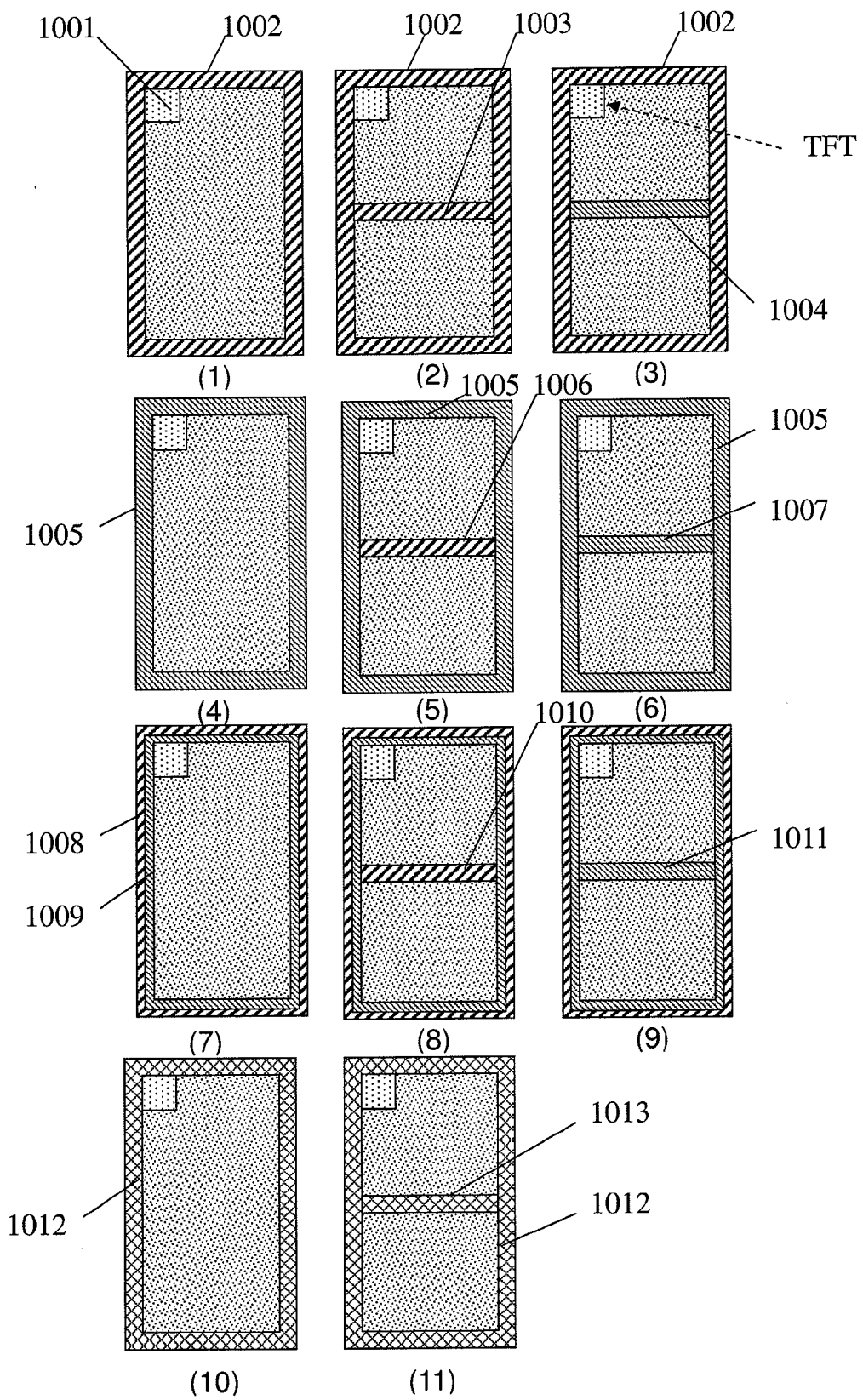
FIG. 10 shows a series of extended structures for LC alignment according to the first LC alignment structure of the present invention.

The abovementioned embodiments are in accordance with the case that a single pixel is consisted of a single display area. In practical applications, the same effect can be achieved when a single pixel is consisted of two or more display areas. FIG. 10 shows a series of configurations using protrusion structures or electrode patterns for LC alignment in a pixel consisting of at least one display area. A TFT device 1001 is disposed at the corner of each display area. The structures (1), (2) and (3) shown in FIG. 10 utilize protrusion structures 1002 as the LC alignment structure, of which structures (2) and (3) further use a protrusion structure 1003 or a ITO slit 1004 at the center for partitioning the single pixel into two display areas. Depending on the requirements of applications, a single pixel can also be partitioned into more display areas. As shown by the structures (4), (5) and (6) in FIG. 10, the LC alignment structure is formed by ITO patterns to produce fringe field 1005, of which structures (5) and (6) a single pixel is further partitioned into two display areas by using a protrusion structure 1006 or a ITO slit 1007 at the center of the structure. The structures (7), (8) and (9) shown in FIG. 10 utilize both protrusion structures 1008 and fringe fields 1009 as the LC alignment structure. Similarly, the single pixel can be further partitioned into two display areas by using a protrusion structure 1010 or a ITO slit 1011 at the center, as shown by the structures (8) and (9) in FIG. 10. Apart from the use of protrusion structures or electrode patterns, indentation structures can also be used for LC alignments and display area partitioning, Such structure using indentation structures 1012 are shown by the structures (8) and (9) in FIG. 10. The LC molecules near the indentation structures will be titled outward, forming a continuous-domain alignment. Similarly, the structure of indentation 1013 can also be used for display area partitioning.

Figure 11:
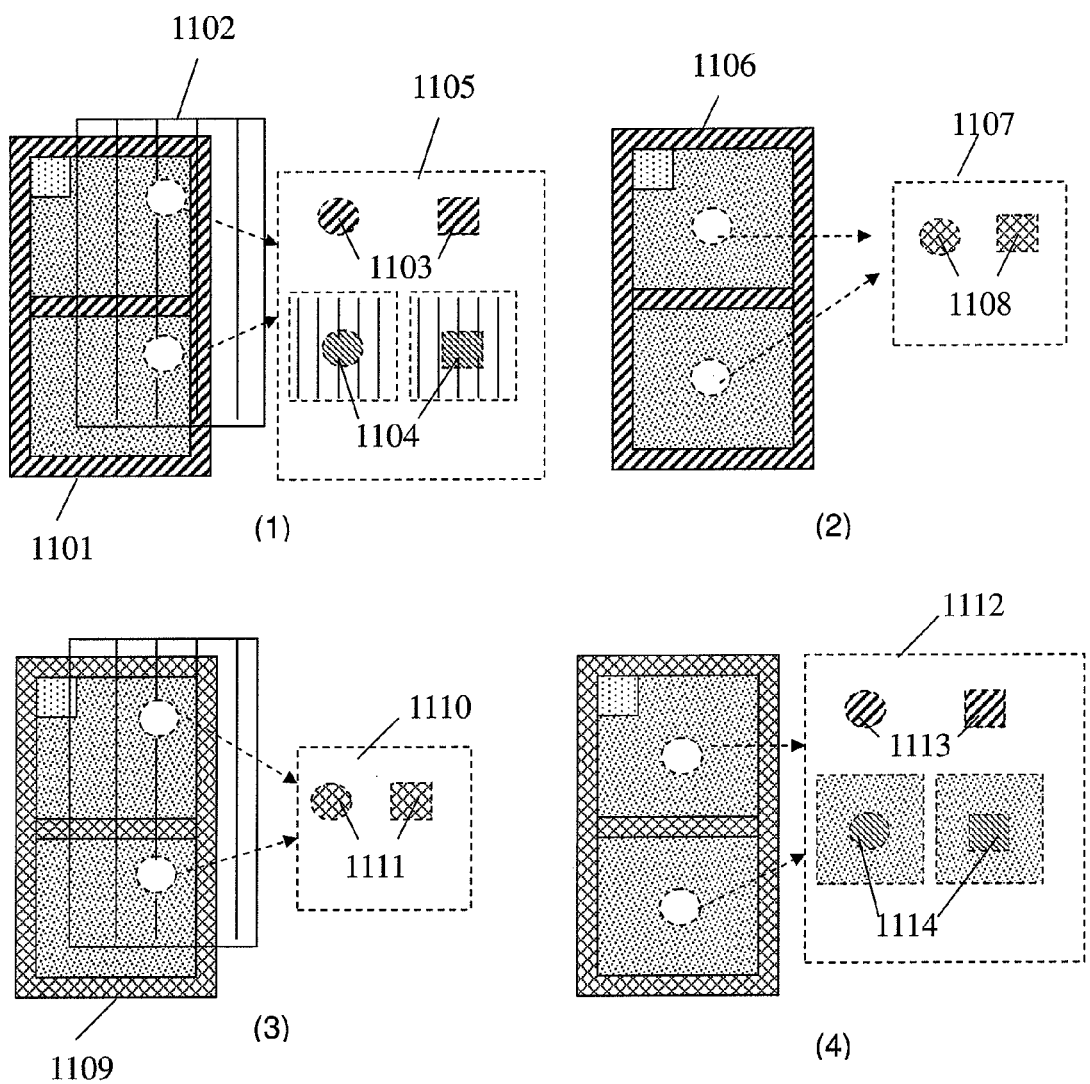
FIG. 11 is a schematic illustrating the second LC alignment structures being disposed at the geometric center of the display area of the present invention.

The abovementioned LC alignment apparatus, which is used to align the LC molecules in the display area into a symmetrically tilted alignment, is referred to as a first LC alignment structure. In order to avoid the influences of the TFT device or the flatness of the substrates on the symmetry of LC alignments, a second LC alignment structure can be added to the geometric center of the display area to further stabilized the LC alignments therein. Structures in FIG. 11 are a series of examples with a second LC alignment structure. In the structure (1) shown in FIG. 11, the first LC alignment structure is formed by protrusion structures 1101 on the lower substrate of a pixel, which is further divided into two display areas by another protrusion structure. In each display area, a protrusion structure 1103 or an electrode pattern 1104 is added on the upper substrate 1102 and disposed at the geometric center of the display area to form the second LC alignment structure 1105. In the structure (2) shown in FIG. 11, the first LC alignment structure 1106 is the same as that in structure (1), while the second LC alignment structure 1107 is formed by an indentation structure 1108 and disposed on the same substrate of the first structure 1106. The structures (3) and (4) shown in FIG. 11 are another two examples, in which the first LC alignment structure is formed by indentation structures 1109 in the surrounding of the display area, which has been partitioned into two areas by another indentation structure. The second LC alignment structure 1110 is also formed by an indentation structure 1111 at the geometric center of each display area and being disposed on another substrate, as shown in the structure (3). On the other hand, as shown in the structure (4), the second LC alignment structure 1112 can also be formed by a protrusion structure 1113 or a electrode pattern 1114 at the geometric center of each display area, but being disposed on the same substrate of the first LC alignment structure 1109.

The shape of the second LC alignment structure in the abovementioned examples can be a square, a circle or other shape with high symmetry. In order to achieve stable alignment, the dimension of the second LC alignment structure must be larger than, or at least comparable to, the thickness of the LC layer.

Figure 12:
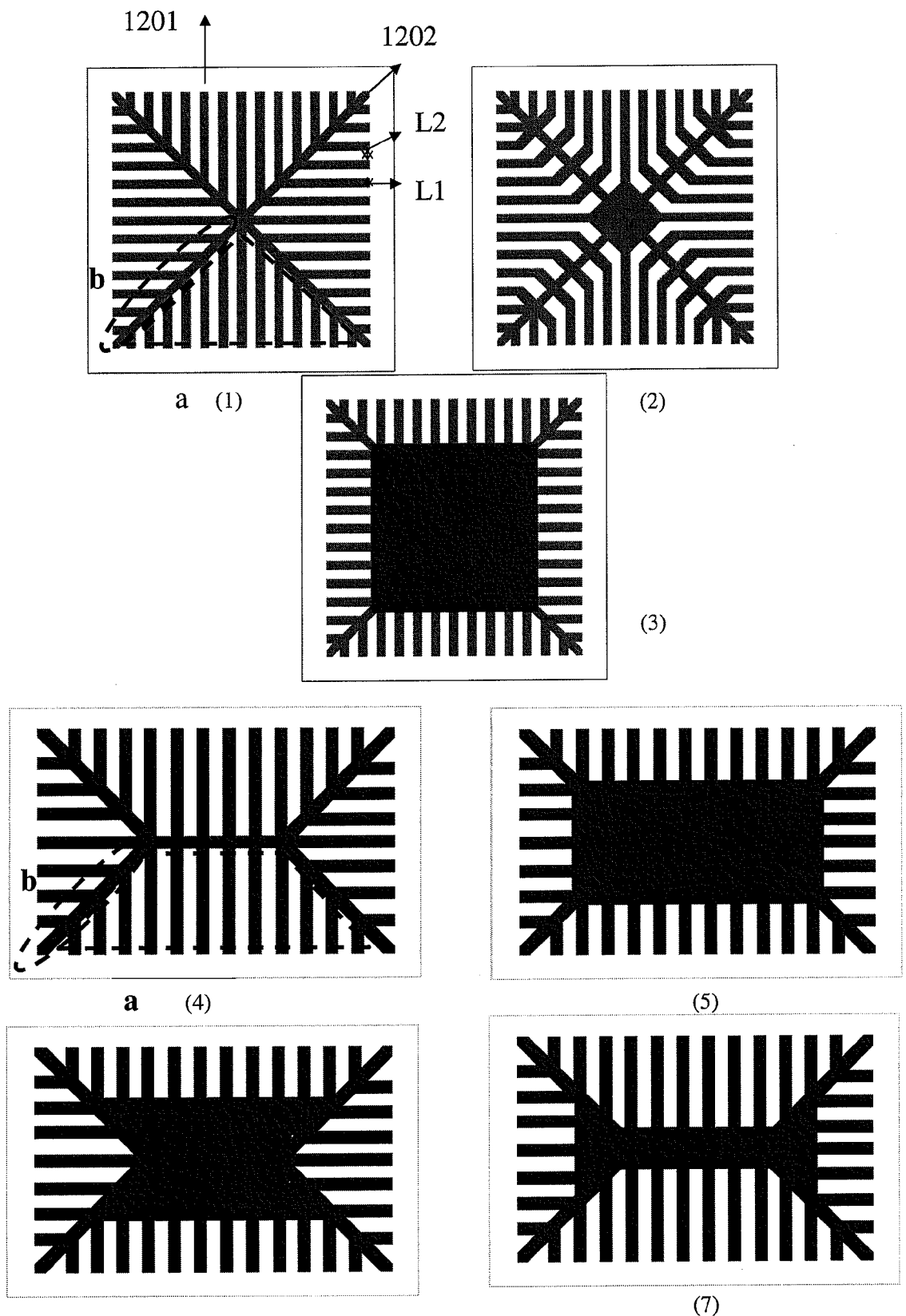
FIG. 12 is a schematic illustrating the structure electrode patterns of the lower substrate under the display area of the present invention.

Embodiment II:

This embodiment is also based on the non-rubbing alignment, using periodic structures of electrode and electrode slits as the first LC alignment structure, and using protrusions, indentations, or fringe fields to control the alignment of TVA mode LC. FIG. 12 shows a structure using fringe field 1201 as an example, of which the periodic structure 1202 of electrode-electrode slits are disposed on the lower substrate of the display area, as shown in structures (1) to (7). In these structures, the widths of the alignment electrode L1 and the ITO slits L2 on the lower substrate are in the range of 3-5 μm. Due to the presence of electrode slit, the rates of LC tilting on the slits will be different from that on the electrodes, leading to a preferential alignment of LC molecules along the direction of electrode slits. In addition, the LC alignment can also be modified by changing the ratio of the areas of the electrodes in regions a and b. Similarly, a second LC alignment structure, formed by either a protrusion or an electrode pattern, can also be added on the upper substrate and at the geometric center of the display area to further stabilize the LC alignment.

Figure 13A:
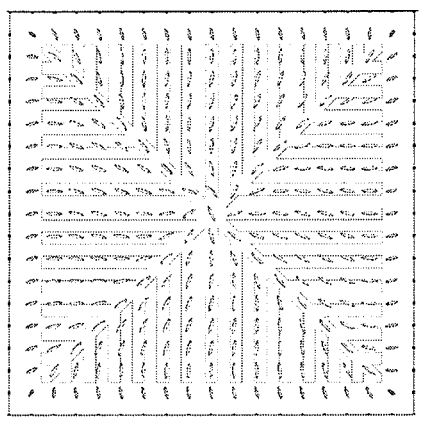
FIGS. 13A and 13B are the top view of the middle LC layer and the corresponding transmittance map using the TVA mode LC of the present invention.
Figure 13B:
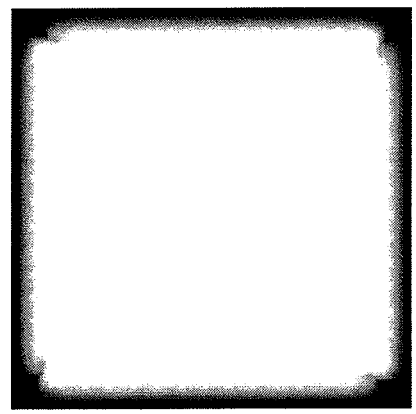

FIG. 13 is an example of the TVA mode LC using the periodic structure shown by the structure (1) in FIG. 12 as the first LC alignment structure. In this structure, the display area is, but not limited, ⅓ of the pixel area. The size of the display area can be changed according to the requirements of practical applications. FIG. 13A shows the top view of the LC alignment of the middle LC layer under a driving bias voltage of 9V. It can be seen that LC molecules are aligned along the direction of electrode slits. FIG. 13B is the corresponding optical transmittance map obtained from numerical simulations. In this calculation, the polarization axes of the upper and the lower polarizer are set at 45° and 135°. From the numerical results, it can be further confirmed that there will be no dark fringes in the display area when the parameters $\Delta$nd and d/p are optimal, improving the overall optical transmittance.

Figure 14:
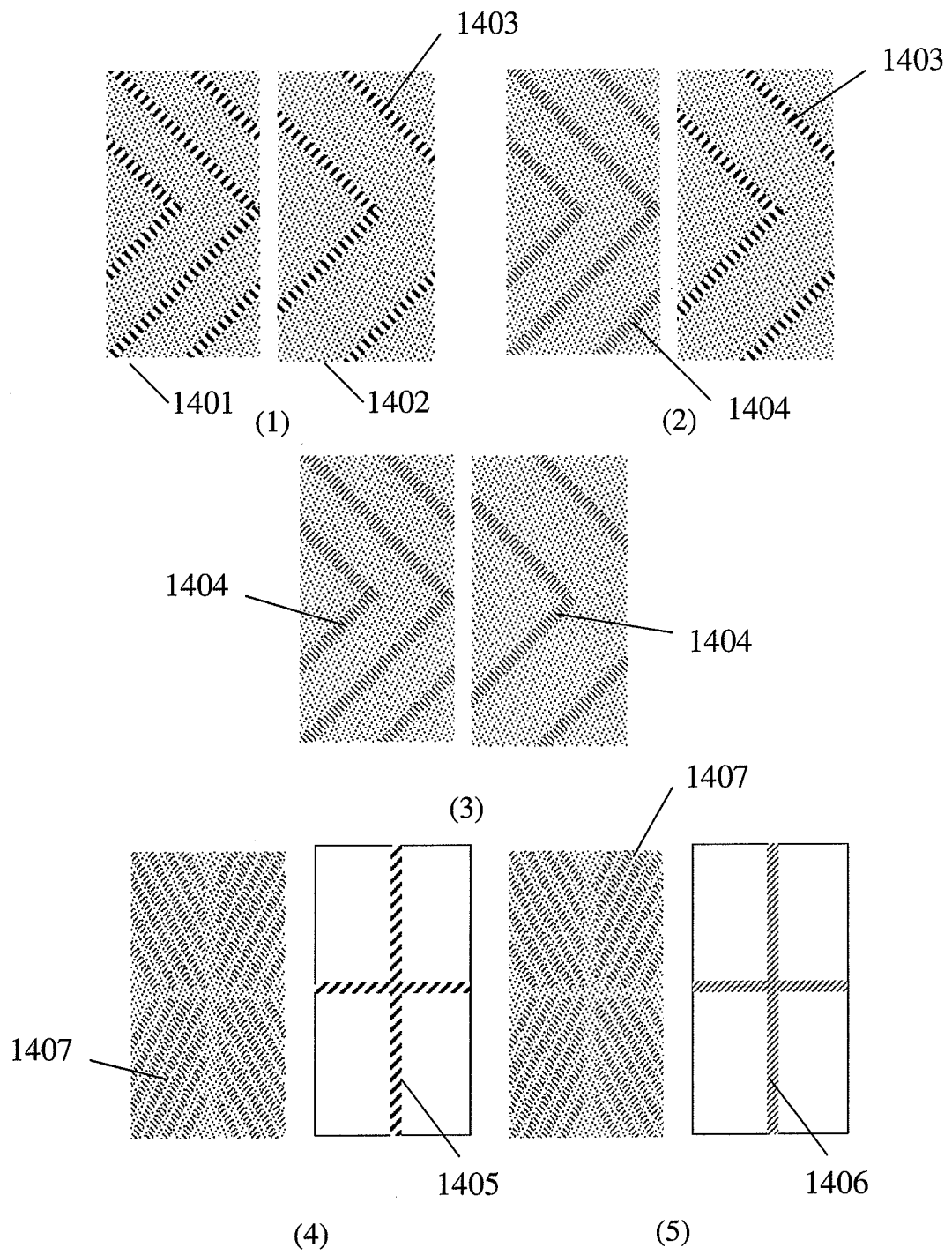
FIG. 14 shows a series of extended structures for LC alignment according to the structure of multi-domain alignment of the present invention.

Embodiment III:

In the abovementioned embodiments I and II, the LC alignment structures are designed for producing a continuous-domain LC alignment. In the present embodiment, the LC alignment structures are designed for producing a multi-domain LC alignment. FIG. 14 shows a series of structures for multi-domain LC alignments. In the structures (1), (2) and (3), the LC alignment structures are formed by a protrusion structure 1403 on the upper substrate 1401 and a structure of "<" shaped electrode slits 1404 on the lower substrate 1402. On the other hand, in the structures (4) and (5), the protrusion structure 1405 or the electrode slits 1406 are designed as "+" shaped alignment, together with a radially aligned structure of electrode slits 1407. These structure are suitable for multi-domain LC alignments.

Figure 15:
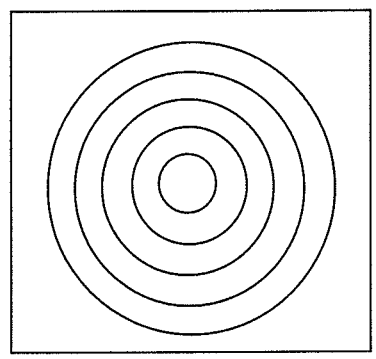
FIG. 15 shows a series of structures for surface alignment used in the present invention.
Figure 15:
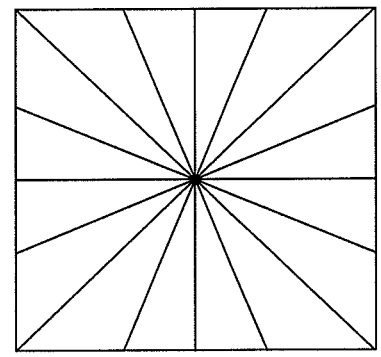
Figure 15:
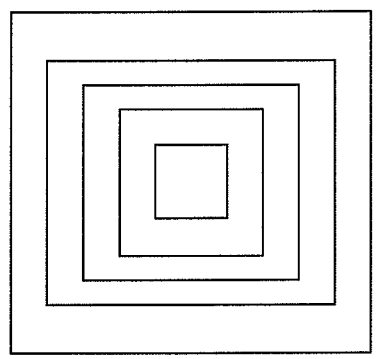
Figure 15:
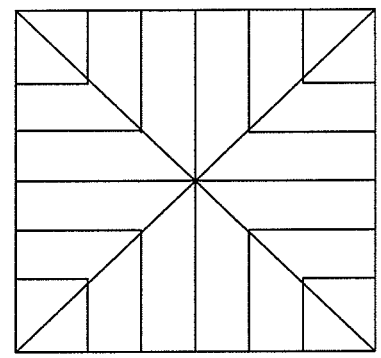
Figure 15:
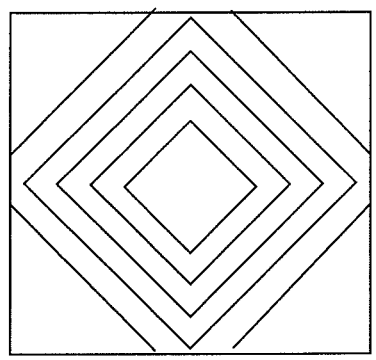
Figure 15:
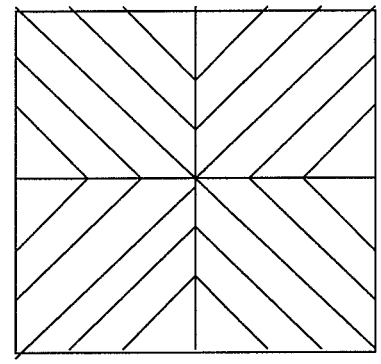

Embodiment IV:

This embodiment is based the conventional rubbing-alignment or the photo-alignment, using the surface alignment film with radially distributed alignment directions to produce a multi-domain or a continuous-domain LC alignment. FIG. 15 shows a series of structures (A, B and C) for the directions of alignment on the upper (a1, b1 and c1) and the lower (a2, b2 and c2) surface alignment films. The combinations of structures shown in FIG. 15 can be used for TVA mode LC alignments. The upper and the lower surface alignment films can also have the same structure, e.g., a1 on both films, but in combined with the use of LC alignment structures described in embodiments I and II for TVA mode LC alignments. On the other hand, for the conventional positive TN type LC, the structures A, B and C in FIG. 15 are also suitable, forming a radially symmetric alignment with a 90°-rotation around the symmetric axis.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A method for obtaining parameters of a liquid crystal (LC) display device, wherein the LC display device consists of at least one display area and comprises a first substrate, a second substrate, a first polarizer, a second polarizer, at least one LC alignment apparatus and a LC layer, the first substrate has a common electrode thereon, the second substrate consists of at least one pixel, each of which contains a pixel electrode and is disposed within the display area, the first polarizer is disposed on the first substrate, the second polarizer is disposed on the second substrate and with a polarization axis being perpendicular to that of the first polarizer, the LC alignment apparatus is disposed between the first and the second substrates, for aligning the LC molecules thereon tilting toward the inner or the outer portion of the display area, and the LC layer with chiral dopants is disposed between the first and the second substrates, with optimal parameters of $\Delta nd$ when d/p, such that, for an arbitrary $\alpha$ angle, the optical transmittance T can be larger than or at least equal to a minimum transmittance value $T_{min}$ ($T \geq T_{min}$), where $\Delta n$ is the index of birefringence of the LC material, d is the thickness of LC layer, p is the chiral pitch of the LC with chiral dopants, and $\alpha$ is the angle between the orientation of LC molecules at middle of the LC layer and the direction of the polarization axis of the first or the second polarizer, the method comprising the steps of:
  (1) finding the contour map of optical transmittance T as a function of $\Delta nd$ and d/p for different $\alpha$ angles by using experimental measurements or theoretical calculations according to the LC material used in the LC layer, the concentration of chiral dopants, the thickness of the LC layer, and the geometric design of the LC alignment apparatus; and
  (2) selecting a minimum transmittance value $T_{min}$ according to the requirement of a given application, such that in the contour map T, there must exist a corresponding set of parameters $\Delta nd$ and d/p, in which all parameters of $\Delta nd$ and d/p satisfy $T \geq T_{min}$.

2. The method according to claim 1, further comprising the steps of:
  (3) determining a first set of parameters, in which all the parameters $\Delta nd$ and d/p satisfy $TT_{min}$ when $\alpha=0°$;
  (4) determining a second set of parameters, in which all the parameters $\Delta nd$ and d/p satisfy $T \geq T_{min}$ when $\alpha=45°$; and
  (5) finding the intersection of the first set and the set of parameters as the optimal set of parameters, in which all the parameters $\Delta nd$ and d/p are optimal parameters satisfying $T \geq T_{min}$ for an arbitrary $\alpha$ angle between 0° and 45°.

3. The method according to claim 2, wherein the LC alignment apparatus further comprising:
  a first alignment structure being disposed on the first substrate or the second substrate for aligning the LC molecules in the display area into a continuous-domain symmetric alignment when a external voltage is applied.

4. The method according to claim 3, wherein the first alignment structure is formed by a protrusion structure surrounding the pixel electrode.

5. The method according to claim 3, wherein the first alignment structure is formed by an electrode pattern, which can produce a fringe field distribution surrounding the pixel electrode and between the common electrode and the pixel electrode.

6. The method according to claim 3, wherein the first alignment structure is formed by a protrusion structure and an electrode pattern being disposed on the same substrate.

7. The method according to claim 3, wherein the first alignment structure is formed by an indentation structure surrounding the pixel electrode.

8. The method according to claim 4, 5 or 6, wherein the display area can be divided into a plural of display areas by partitioning the pixel electrode using a protrusion structure or an electrode slit.

9. The method according to claim 7, wherein the display area can be divided into a plural of display areas by partitioning the pixel electrode using an indentation structure.

10. The method according to claim 3, wherein the LC alignment apparatus further comprising:
  a second alignment structure being disposed on the first substrate or the second substrate for aligning the LC molecules into a symmetric alignment with a symmetric point being close to the geometric center of the display area.

11. The method according to claim 10, wherein the second alignment structure is formed by a protrusion structure with a geometric shape of square, rectangular, circle, or other symmetric shapes.

12. The method according to claim 10, wherein the second alignment structure is formed by an electrode pattern with a geometric shape of square, rectangular, circle, or other symmetric shapes.

13. The method according to claim 10, wherein the second alignment structure is formed by an indentation structure with a geometric shape of square, rectangular, circle, or other symmetric shapes.

14. The method according to claim 2, wherein the LC alignment apparatus further comprising:
  a first alignment structure being disposed on the first substrate or the second substrate; and
  a second alignment structure being disposed on the first substrate or the second substrate;
  wherein the first alignment structure is a symmetrically aligned structure of electrodes and electrode slits, and
  wherein the second alignment structure is a structure corresponding to the first alignment structure and disposed on the substrate with the first alignment structure thereon, and
  wherein the first alignment structure combined with the second alignment structure can align the LC molecules in the display area into a continuous-domain symmetric alignment when a external voltage is applied.

15. The method according to claim 14, wherein the width of the electrode and the width electrode slit of the symmetrically aligned structure of electrodes and electrode slits are in the range of 3-5 µm.

16. The method according to claim 14, wherein the second alignment structure is formed by a protrusion structure surrounding the pixel electrode.

17. The method according to claim 14, wherein the second alignment structure is formed by an indentation structure surrounding the pixel electrode.

18. The method according to claim 14, wherein the second alignment structure is formed by an electrode pattern surrounding the pixel electrode, which can produce a fringe field distribution surrounding the pixel electrode and between the common electrode and the pixel electrode.

19. The method according to claim 2, wherein the LC alignment apparatus further comprising:
  a first alignment structure being disposed on the first substrate or the second substrate; and
  a second alignment structure being disposed on the first substrate or the second substrate;
  wherein the first alignment structure is a periodically aligned structure, and
  wherein the second alignment structure is a structure corresponding to the first alignment structure, and
  wherein the first alignment structure combined with the second alignment structure can align the LC molecules in the display area into a multi-domain symmetric alignment when a external voltage is applied.

20. The method according to claim 19, wherein the first alignment structure is formed by a plurality of protrusion structures being disposed on the same substrate.

21. The method according to claim 19, wherein the first alignment structure is formed by a plurality of electrode slits being disposed on the same substrate.

22. The method according to claim 19, wherein the first alignment structure is formed by a plurality of protrusion structures and a plurality of electrode slits being disposed on the same substrate.

23. The method according to claim 19, wherein the second alignment structure is formed by a plurality of protrusion structures being disposed on another substrate different from the one with the first alignment structure thereon.

24. The method according to claim 19, wherein the second alignment structure is formed by a plurality of electrode slits being disposed on another substrate different from the one with the first alignment structure thereon.

25. The method according to claim 19, wherein the second alignment structure is formed by a plurality of protrusion structures and a plurality of electrode slits being disposed on another substrate different from the one with the first alignment structure thereon.

26. The method according to claim 2, wherein the LC alignment apparatus is a rubbing-alignment apparatus, which can align the LC molecules in the display area into a symmetric alignment.

27. The method according to claim 2, wherein the LC alignment apparatus is a photo-alignment apparatus, which can align the LC molecules in the display area into a symmetric alignment.

28. The method according to one of claims 3 to 7 or claims 9 to 13, wherein the LC alignment apparatus is a rubbing-alignment apparatus, which can align the LC molecules in the display area into a symmetric alignment.

29. The method according to one of the claims 3 to 7 or claims 9 to 13, wherein the LC alignment apparatus is a photo-alignment apparatus, which can align the LC molecules in the display area into a symmetric alignment.

30. The method according to claim 8, wherein the LC alignment apparatus is a rubbing-alignment apparatus, which can align the LC molecules in the display area into a symmetric alignment.

31. The method according to claim 8, wherein the LC alignment apparatus is a photo-alignment apparatus, which can align the LC molecules in the display area into a symmetric alignment.

32. The method according to one of the claims 14 to 18, wherein the LC alignment apparatus is a rubbing-alignment apparatus, which can align the LC molecules in the display area into a symmetric alignment.

33. The method according to one of the claims 14 to 18, wherein the LC alignment apparatus is a photo-alignment apparatus, which can align the LC molecules in the display area into a symmetric alignment.

34. The method according to claim 2, wherein the LC layer is formed by a vertically aligned negative twisted nematic LC material, of which the tilted angle on the surfaces of the first and the second substrates is between 0° and 90°.

35. The method according to claim 2, wherein the LC layer is formed by a horizontally aligned positive twisted nematic LC material, of which the tilted angle on the surfaces of the first and the second substrates is 90°.

* * * * *